Jan. 9, 1951 P. E. VOLZ 2,537,610
AUTOMATIC PHASING IN FACSIMILE SYSTEMS
Filed Jan. 15, 1947 2 Sheets-Sheet 1
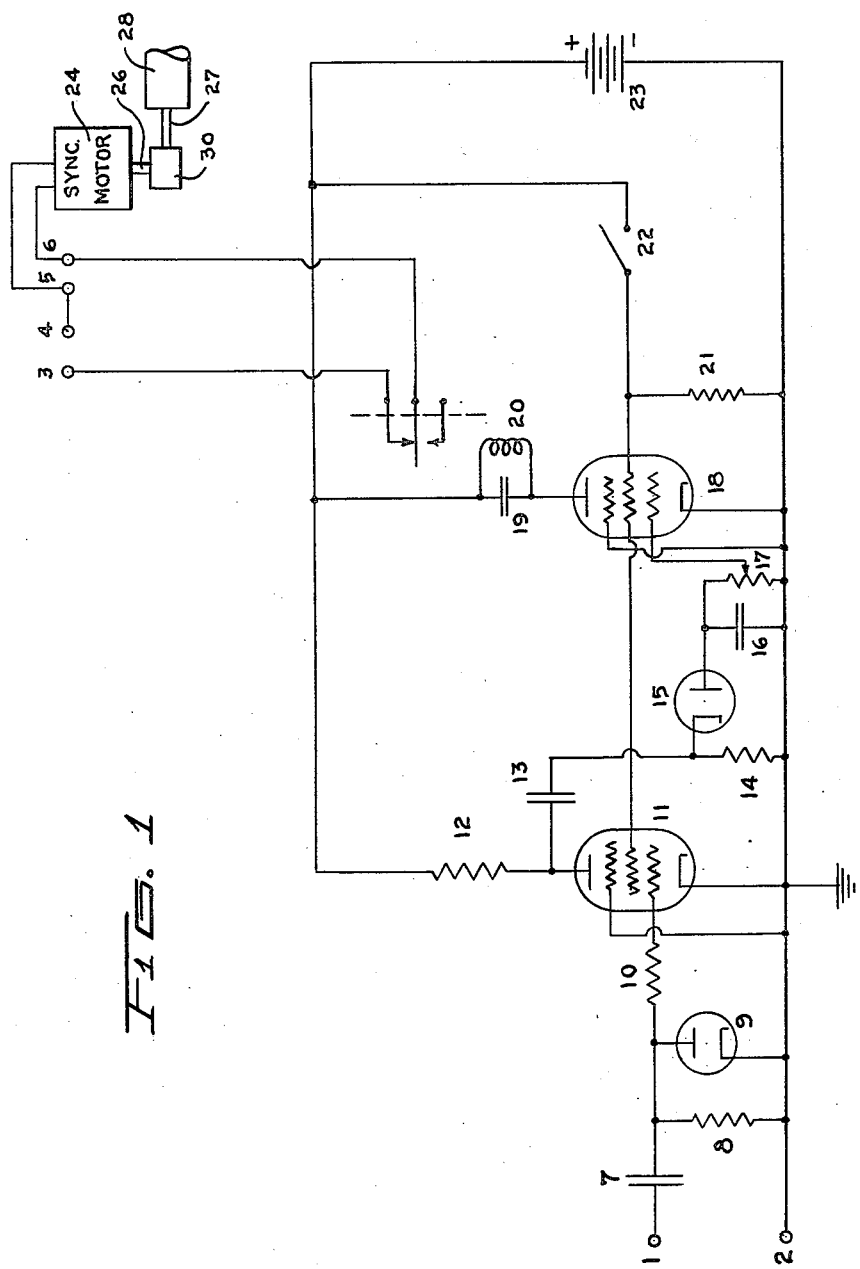
INVENTOR.
PHILIP E. VOLZ
BY
Ostrolenk + Faber
ATTORNEYS

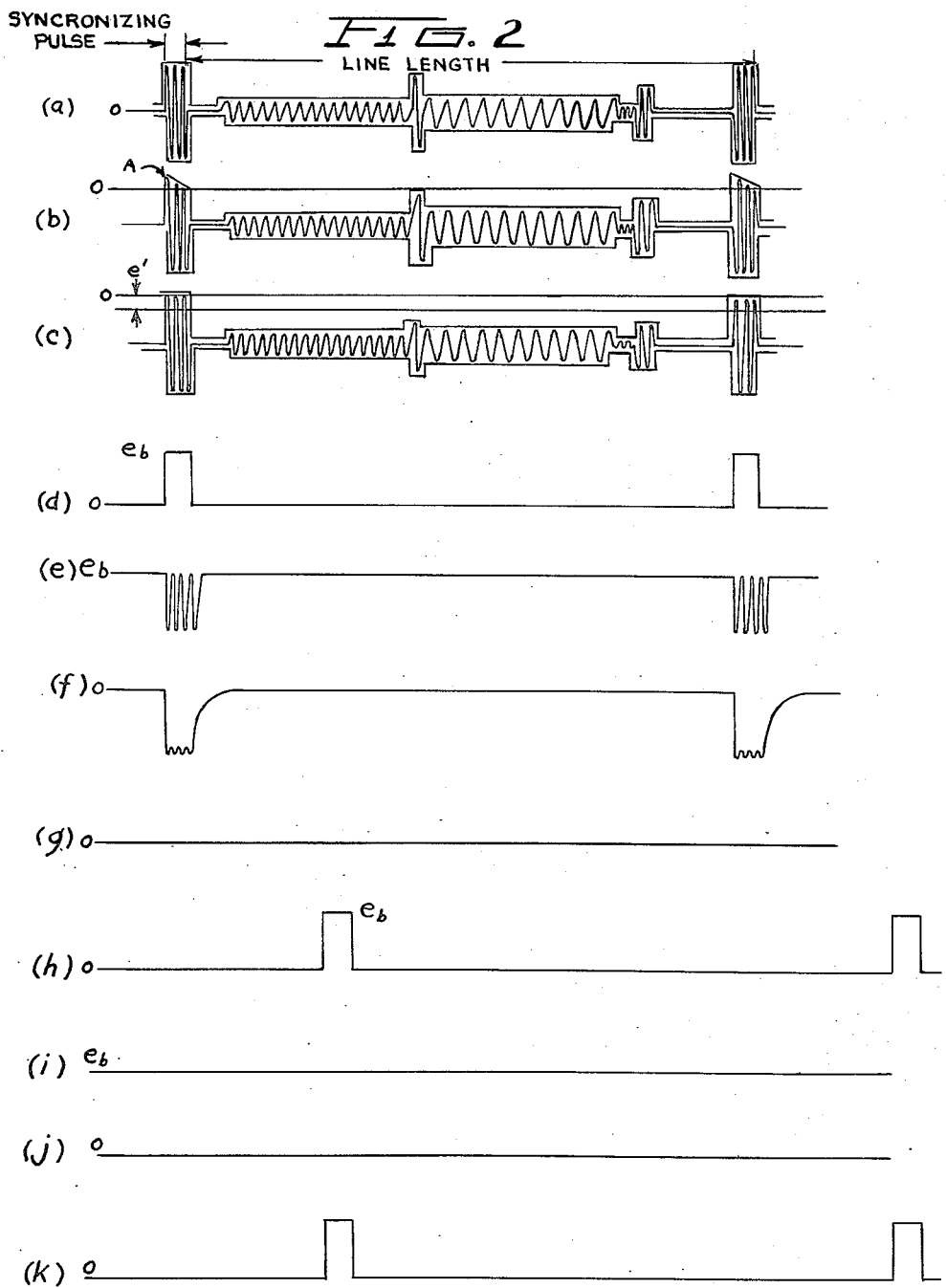

Patented Jan. 9, 1951

2,537,610

UNITED STATES PATENT OFFICE 2,537,610

AUTOMATIC PHASING IN FACSIMILE SYSTEMS

Philip E. Volz, Orange, N. J., assignor, by mesne assignments, to Pierce Company, Providence, R. I.

Application January 15, 1947, Serial No. 722,129

2 Claims. (Cl. 178—69.5)

My present invention relates to facsimile systems, the transmission and reception of pictures, printed and written matter, and more particularly to a novel automatic synchronizing and phasing system adapted to maintain the receiver in phase with the transmitter.

More particularly my novel phasing system is one which is adapted to maintenance of appropriate phase relation between transmitter and receiver where these elements are oprated from the same power supply as in a large city or from identical power supply sources maintained in phase with each other.

In accordance with my invention, the transmitter and receiver are operated by synchronous motors or by other means which control the driving motors to make their speeds identical. My novel automatic phasing system adjusts the phase of one of the two motor rotors or slow speed shafts which drive the actual facsimile elements to the desired phase relationship by comparing the phase of a phasing pulse or timing signal generated at one motor or slow speed shaft and another phasing pulse or timing signal generated at the motor or slow speed shaft to be controlled.

In brief, the controlled motor, preferably the receiver motor, is allowed to slip from synchronism once during each timing interval by an amount equal to one or more poles on the synchronous motor (or its equivalent when other mechanical power sources are being controlled) until the phasing or timing pulse indicating that the phase of the one motor occurs in synchronism with the pulse indicating the phase of the controlled motor.

When this condition is brought about, the two sources of mechanical power are in the desired phase relationship and the automatic phasing system allows the controlled motor to run in this desired phase relationship.

If for any reason the desired phase relation is destroyed such as by momentarily turning off one or the other sources of mechanical power or momentarily overloading one of the motors so that it is pulled out of synchronism, my novel automatic phasing system will by the method described again establish the desired phase relationship, when the sources are re-energized or the overload removed.

In addition, when the uncontrolled source of mechanical power is de-energized for a longer period of time, the automatic phasing system will try to phase for a short period of time and then will allow the controlled motor to continue to run at any arbitrary phase.

It is an object of my invention to provide automatic phasing of the foregoing type to a facsimile receiver in accordance with signals received from the facsimile transmitter the said phasing signals consisting of a synchronizing pulse about 5% of the line length in duration and equal in amplitude to the black level of the picture being transmitted.

The foregoing and many other objects of my invention will become apparent in the following description and drawings in which:

Figure 1 is a circuit diagram of my novel phasing system.

Figures 2a to 2k illustrate schematically the signal voltages at various phases in the operation of my novel phasing system.

Referring first to Figure 1, the received facsimile signal of suitable level is fed into terminals 1 and 2 and coupled through capacitor 7 to the clamping circuit consisting of diode 9 and discharge resistor 8. The clamped signal is fed through resistor 10 to the grid of pentode 11. Both pentode 11 and pentode 18 are fed screen voltage from the supply 23 for a period of time equal in length to the incoming synchronizing pulse through a switch 22 which is driven mechanically from the receiver motor directly or in this case from the low speed drum shaft 27 for drum 28 which is geared to the motor shaft 26 through gear box 30. The receiver may be of the type shown in Patent No. 2,413,962.

The output of pentode 11 is the signal voltage across resistor 12 and this is coupled through capacitor 13 to a load resistor 14 and a diode 15. The diode 15 feeds the filter consisting of capacitor 16 and potentiometer 17, and the grid of pentode 18. The resistor 21 serves to keep the screen potential of pentodes 11 and 18 at essentially zero when switch 22 is open. The plate circuit of pentode 18 consists of the relay coil 20 in parallel with a capacitor 19. The normally closed set of contacts on relay 20 are in series between the power source connected to terminals 3 and 4 and the synchronous motor 24 connected to terminals 5 and 6.

Figure 2 serves to clarify the operation of the circuit by showing the signal voltages at various places in the circuit. Figure 2a shows the input facsimile signal applied to terminals 1 and 2. Diode 9 clamps the positive peaks at essentially zero voltage and since the discharge time constant for capacitor 7 and resistor 8 is made much greater than the interval between synchronizing pulses, the voltage appearing across the clamping diode 9 is as shown in Figure 2b.

The rise of voltage above zero due to diode voltage drop shown at A in Figure 2b is not desirable and this is practically removed by using the grid of pentode 11 and the series grid resistor 10 as an additional or cascade clamper. The voltage appearing at the first grid of pentode 11 is shown in Figure 2c and the voltage designated $e^1$ is the cut-off grid voltage of pentode 11, when its screen is connected to the supply.

The black level which is the synchronizing pulse and any black in the picture signal drives the grid of pentode 11 to zero voltage, while the white level which is much less (about 30 db down from black) is very much below cut-off voltage. The local synchronizing pulse is generated by switch 22 actuated by drum shaft 27. This is fed to the circuit as screen voltage for both pentodes.

Under the proper phase condition, the local pulse occurs in phase with the incoming synchronizing pulse and is so shown in Figure 2d. Under this condition, the voltage drop across resistor 12 is shown in Figure 2e and consists of rectified pulses of carrier voltage.

The output of diode 15 is shown in Figure 2f under the proper phase condition and the negative pulse occurring in coincidence with the screen pulse is great enough to cut-off pentode 18 so that the plate current remains at zero as shown in Figure 2g and the relay 20 does not operate. Thus when the proper phase condition is reached the relay 20 does not operate and hence the motor 24 continues to run in the proper phase relation.

When the proper phase condition does not exist the signal voltages Figures 2a and 2b, and 2c are still as shown, but the local pulse is misaligned as shown in Figure 2h. The output of pentode 11 is now zero during the local pulse as shown in Figure 2i and hence the output of diode 15 during the local pulse is zero as shown in Figure 2j.

With zero grid voltages on pentode 18, the plate current pulse occurs during the local pulse as shown in Figure 2k and this current operates the relay 20. Since the operate and release time of relay 20 is small compared to the synchronizing pulse length, the relay operates and opens the motor supply circuit for a period of time equal to the synchronizing pulse length and then recloses this circuit.

The mechanical load on the motor is made such that during this break in the supply circuit, the motor slips one pole. It continues to slip one pole for each revolution of the drum until the local pulse and the incoming synchronizing pulse are aligned.

The phase of the supply voltage for the synchronous motor 24 at the receiver is fixed relative to the phase of the voltage supply to the synchronous motor at the transmitter by any desired method. Since there are a finite number of possible positions of the local synchronizing pulse depending on the number of poles on the motor and the gear reduction used between the motor shaft 26 and the drum shaft 27 which drives the switch 22, it may be that the incoming synchronizing pulse and the local synchronizing pulse do not align properly for any of the finite number of possible positions of the local synchronizing pulse.

Proper alignment for one of the finite number of positions of the local pulse with the incoming pulse is obtained by adjustment of the position of the rotor of motor 24 relative to the drum shaft 27 which operates switch 22.

With this proper adjustment, the local and incoming synchronizing pulses are of equal duration and in exact alignment for only one of the possible local pulse positions.

The capacitor 19 across relay coil 20 causes an integrating action to take place, which allows the automatic phasing to operate satisfactorily when receiving printed matter and pictures. The integrating action discriminates between short pulses of full black (printed matter and detail in pictures) and the full black which occurs for the duration of the synchronizing pulse.

My device will automatically phase the receiver even when the receiver is turned on during the transmission of copy. However, if a picture contains areas of full black that are at least as long as the synchronizing pulse and the receiver is turned on during the transmission of a picture, the device will frame on the first full black it steps back to, which is sufficiently wide. This means that the device may phase on a black part of the picture instead of the incoming synchronizing pulse. However, as soon as the full black ends (as changing to gray) or the picture ends the device will frame properly on the incoming synchronizing pulse.

If there is no input signal the voltage at the grid of pentode 11 is zero and hence regardless of when in time the local pulse occurs the output of pentode 11 is a negative rectangular pulse which is applied through diode 15 to the grid of pentode 18 and keeps its grid past cut-off and hence the relay does not operate. This keeps the device inoperative when there is no signal input.

By reference to Figure 2c, it is obvious that if the maximum signal amplitude is large compared to the cut-off voltage $e^1$ that a great reduction in maximum signal amplitude can be tolerated before the device ceases to function properly. Hence the device can automatically phase the receiver motor over a very large range of input signal level.

The potentiometer 17 allows adjustment of the threshold at which the device will phase. It is so adjusted that the device will lock only on full black and not on gray. The setting of this control plus the integrating action of capacitor 19 allows the device to discriminate between the incoming synchronizing pulse and long pulses of less than full black (as in a picture) and short pulses of full black (as printing).

In the foregoing I have described my invention solely in connection with a preferred illustrative embodiment thereof. Since many variations and modifications will now be obvious to those skilled in the art, I prefer to be bound, not by the specific disclosures herein contained but only by the appended claims.

I claim:

1. In a facsimile receiver for receiving facsimile phasing signals, a movable member to be operated in synchronism and phase with a remote transmitter, a multi-pole synchronous motor for driving said member, a circuit for connecting said motor to a source of power, a relay having an armature for normally maintaining said circuit to said motor closed, an electron tube having a cathode, an anode, a first and second grid, circuit connections for impressing a negative potential on said first grid in response to an incoming phasing signal, an oscillating switching means having an open and closed circuit position and moved to its closed position by said movable member, circuit connections including said switching means for periodically applying a positive potential on said second grid in phase with said incoming phasing signals when said movable member is in proper phase relation with said incoming signals, and an output circuit for said electron tube including its cathode and anode and said relay for energizing said relay only when the incoming phasing signals are not coincident with the signals controlled by said movable member for permitting said motor to slip a pole to restore correct phase relation with said incoming signals.

2. In a facsimile receiver for receiving facsimile phasing signals, a movable member to be operated in synchronism and phase with a remote transmitter, a multi-pole synchronous motor for driving said member, a circuit for connecting said motor to a source of power, a relay having an armature for normally maintaining said circuit to said motor closed, an electron tube having a cathode, an anode, a first and second grid, circuit connections for impressing a negative potential on said first grid in response to an incoming phasing signal, said circuit connections including a second electron tube having an input connectible to a source of incoming signals and an output, a diode having one electrode connected to said output circuit and its other electrode connected to said first grid for applying a negative potential to said first grid in response to an incoming phasing signal impressed on said second electrode, an oscillating switching means having an open and closed circuit position and moved to its closed position by said movable member, circuit connections including said switching means for periodically applying a positive potential on said second grid in phase with said incoming phasing signals when said movable member is in proper phase relation with said incoming signals, and an output circuit for said electron tube including its cathode and anode and said relay for energizing said relay only when the incoming phasing signals are not coincident with the signals controlled by said movable member for permitting said motor to slip a pole to restore correct phase relation with said incoming signals.

PHILIP E. VOLZ.

REFERENCES CITED

The following references are of record in the file of this patent:

UNITED STATES PATENTS

| Number | Name | Date |
|---|---|---|
| 2,150,239 | Nichols | Apr. 14, 1939 |
| 2,230,820 | Young | Feb. 4, 1941 |
| 2,246,284 | Artzt | June 17, 1941 |
| 2,309,622 | Anderson | Feb. 2, 1943 |
| 2,350,008 | Artzt | May 30, 1944 |
| 2,383,360 | Artzt | Aug. 21, 1945 |
| 2,399,421 | Artzt | Apr. 30, 1946 |
| 2,428,946 | Somers | Oct. 14, 1947 |